US010733454B2

(12) United States Patent
Bharde et al.

(10) Patent No.: US 10,733,454 B2
(45) Date of Patent: Aug. 4, 2020

(54) TRANSFORMATION OF VIDEO STREAMS

(71) Applicant: HEWLETT PACKARD ENTERPRISE DEVELOPMENT LP, Houston, TX (US)

(72) Inventors: Madhumita Bharde, Bangalore (IN); Suparna Bhattacharya, Bangalore (IN); Dileep Deepa Shree, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 85 days.

(21) Appl. No.: 16/023,848

(22) Filed: Jun. 29, 2018

(65) Prior Publication Data

US 2020/0005048 A1 Jan. 2, 2020

(51) Int. Cl.
*G06K 9/00* (2006.01)
*H04N 21/234* (2011.01)
*H04N 21/414* (2011.01)
*H04N 21/222* (2011.01)
*H04N 21/4223* (2011.01)
(Continued)

(52) U.S. Cl.
CPC ..... *G06K 9/00758* (2013.01); *G06K 9/00765* (2013.01); *H04N 21/222* (2013.01); *H04N 21/231* (2013.01); *H04N 21/23109* (2013.01); *H04N 21/23418* (2013.01);
(Continued)

(58) Field of Classification Search
CPC .. G06K 9/00758; G06K 9/00765; G06K 9/00; H04N 21/23418; H04N 1/40–60; H04N 9/69–74; H04N 19/00; G06T 7/0012; G06T 7/0051; G06T 7/0002; G06T 7/0024; G06T 1/0021; G06T 7/408; G06T 7/0079; G06T 9/00; G06T 5/00; G06T 3/00; A61B 1/00; A61B 5/00; G06F 16/00
See application file for complete search history.

(56) References Cited

U.S. PATENT DOCUMENTS 6,928,233 B1 * 8/2005 Walker ................ H04N 19/503
386/241
7,664,183 B2 2/2010 Freeman et al.
(Continued)

OTHER PUBLICATIONS

Wikipedia, "Data compression", (webpage), available online at <https://en.wikipedia.org/w/index.php?title=Data_compression&oldid=852382662>, Jun. 16, 2018, 13 pages.
(Continued)

*Primary Examiner* — Zhitong Chen
(74) *Attorney, Agent, or Firm* — Hewlett Packard Enterprise Patent Department

(57) ABSTRACT

Example aspects for transformation of video streams include searching for a first signature of a segment of a video stream in an index comprising a first level signature of each of a plurality of stored segments. In response to identifying a first set of similar segments from the stored segments, a second signature of the segment may be determined. In response to identifying a second set of similar segments from the first set of similar segments based on the second signature, a matching segment may be ascertained from the second set of similar segments. The matching segment may be provided for being stored in place of the segment in a storage medium.

20 Claims, 9 Drawing Sheets

(51) Int. Cl.
*H04N 21/231* (2011.01)
*H04N 21/845* (2011.01)

(52) U.S. Cl.
CPC ... *H04N 21/41422* (2013.01); *H04N 21/4223* (2013.01); *H04N 21/8456* (2013.01)

(56) References Cited

U.S. PATENT DOCUMENTS

| | | | |
|---|---|---|---|
| 8,723,891 B2 | 5/2014 | Chowdhry et al. | |
| 9,774,890 B2 | 9/2017 | St. John-Larkin | |
| 2009/0007202 A1* | 1/2009 | Williams | H04N 7/17309 725/105 |
| 2013/0144846 A1* | 6/2013 | Chhaunker | G06F 7/00 707/692 |
| 2019/0230387 A1* | 7/2019 | Gersten | G06F 16/783 |

OTHER PUBLICATIONS

Wikipedia, "Compressed sensing", (webpage), available online at <https://en.wikipedia.org/w/index.php?title=Compressed_sensing&oldid=846516715>, Jun. 19, 2018, 14 pages.

Shicai, "MobileNet-Caffe", GitHub, available online at <https://github.com/shicai/MobileNet-Caffe>, Feb. 5, 2018, 3 pages.

Oliva et al., "Building the gist of a scene: the role of global image features in recognition", Chapter 2, In Martinez-Conde, Macknik, Martinez, Alonso & Tse (Eds.), Progress in Brain Research, vol. 155, 2006, pp. 23-36.

Nelson, Patrick, "Just one autonomous car will use 4,000 GB of data/day", (web page), Network World, available online at <https://www.networkworld.com/article/3147892/internet/one-autonomous-car-will-use-4000-gb-of-dataday.html>, Dec. 7, 2016, 5 pages.

Krishnamurthy et al., "A Memory-Driven Computing Approach to High-Dimensional Similarity Search", Hewlett Packard Labs, Technical Report HPE-2016-45, May 11, 2016, 9 pages.

Jiang et al., "Surveillance Video Processing Using Compressive Sensing", Inverse Problems and Imaging, vol. 6, No. 2, 2012, 14 pages.

Grauman et al., "Learning Binary Hash Codes for Large-Scale Image Search", In: Cipolla et al. (eds) Machine Learning for Computer Vision. Studies in Computational Intelligence, vol. 411, 2013, 39 pages.

Eliot, Lance, "Compressive Sensing for AI Self-Driving Cars", (webpage), AI Trends, available online at <https://aitrends.com/ai-insider/compressive-sensing-ai-self-driving-cars/>, Jan. 9, 2018, 7 pages.

Dewakar et al., "Storage Efficiency Opportunities and Analysis for Video Repositories", Proceedings of the 7th USENIX Conference on Hot Topics in Storage and File Systems, 2015, 5 pages.

Clarke, Roger J., "Image and Video Compression: A Survey", International Journal of Imaging Systems and Technology, vol. 10, No. 1, pp. 20-32, 1999.

Chen et al., "Surveillance Video Coding via Low-Rank and Sparse Decomposition", Proceedings of the 20th ACM international conference on Multimedia, 2012, 4 pages.

Baraniuk et al., "Compressive Video Sensing: Algorithms, architectures, and applications", IEEE Signal Processing Magazine, vol. 34, 2017, pp. 52-66.

"pHash: The open source perceptual hash library", (webpage), available online at <http://www.phash.org/>, 2010, 3 pages.

Yeguang Li and Ke Xia, "Fast Video Deduplication via Locality Sensitive Hashing with Similarity Ranking," Proceedings of the International Conference on Internet Multimedia Computing and Service, Aug. 2016, pp. 94-98, ACM.

Zi Huang et al., "Practical Online Near-duplicate Subsequence," IEEE Transactions on Multimedia, Aug. 2010, pp. 386-398, vol. 12, No. 5, IEEE.

\* cited by examiner

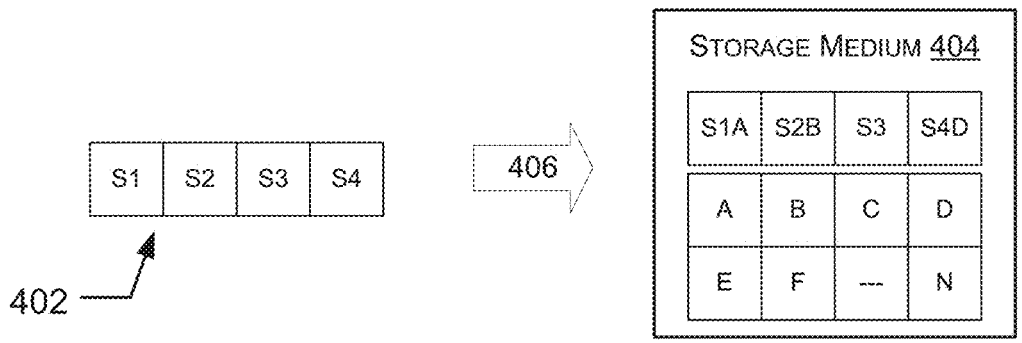

| Dictionary 408 | | | |
|---|---|---|---|
| First Level Signature | Second Level Signature | Data Block Location | Data Block Identifier |
| First Hash 1 | Second Hash 11 | Pointer 11, Offset | A |
| | Second Hash 12 | Pointer 12, Offset | B |
| | Second Hash 13 | Pointer 13, Offset | C |
| First Hash 2 | Second Hash 21 | Pointer 21, Offset | D |
| | Second Hash 22 | Pointer 22, Offset | E |
| | Secon Hash 23 | Pointer 23, Offset | F |
| | Second Hash 24 | Pointer M4, Offset | S3 |
| --- | --- | --- | --- |
| First Hash N | Second Hash N1 | Pointer N1, Offset | N1 |
| | Second Hash N2 | Pointer N2, Offset | N2 |
| | Second Hash N3 | Pointer N3, Offset | N3 |

DE-DUPLICATION INDEX 410

| File Index 412 | | |
|---|---|---|
| File Identifier | File metadata | Component Data Block identifiers |
| File 1 (402) | PQR | S1A, S2B, S3, S4D |
| File 2 | XYZ | A,B,E,F |
| --- | | |
| File N | | |

| Data Block Index 414 | | |
|---|---|---|
| Dedup Hash | Data Block Location | Data Block Identifier |
| DHash 1 | Pointer 11, Offset | A |
| DHash 1 | Pointer M1, Offset | S1A |
| DHash 2 | Pointer 12, Offset | B |
| DHash 2 | Pointer M2, Offset | S2B |
| DHash 3 | Pointer 13, Offset | C |
| DHash 4 | Pointer 21, Offset | D |
| DHash 4 | Pointer M3, Offset | S4D |
| Dhash 5 | Pointer M4, Offset | S3 |
| --- | --- | --- |
| DHash N | Pointer N, Offset | N |

Fig. 4A

TRANSFORMATION OF VIDEO STREAMS

BACKGROUND

A network may include edge devices in communication with a core network. An edge device may be understood as a computing device that is at a periphery of a network and acts as an entry point into the network. The core network can include data centers and computing devices for aggregating, storing, and processing large amounts of data. Data that is generated or received by different edge devices may be sent to the core network, for example, for deep learning and training. The edge devices may also have some data processing capabilities, for example, for real-time decision making.

BRIEF DESCRIPTION OF DRAWINGS

The following detailed description references the drawings, wherein:

FIG. 4A illustrates transformation of a video stream using a dictionary, according to an example;

DETAILED DESCRIPTION

Figure 1:
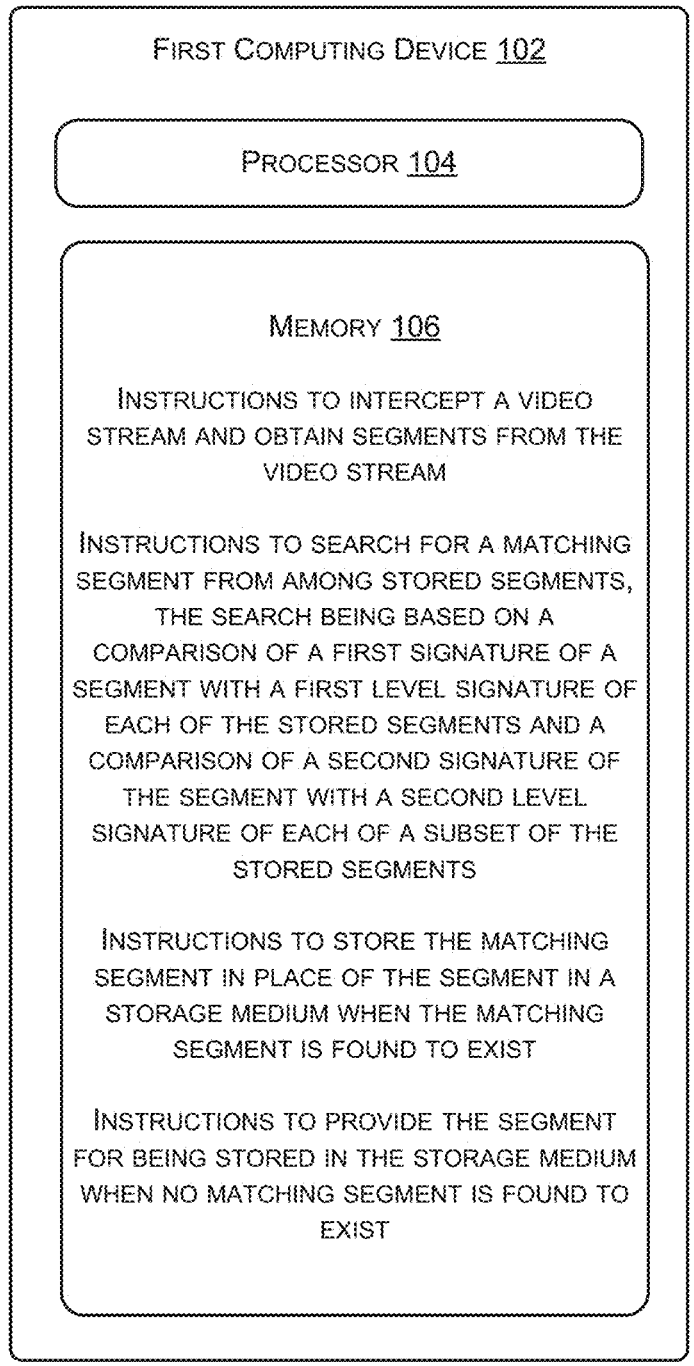
FIG. 1 illustrates a first computing device for transformation of video streams, according to an example.

Edge devices are increasingly being used in applications, such as autonomous driving, video surveillance, home automation, and the like, which rely on video data. Hence, the amount of video data that has to be stored at and transferred from the edge devices to the core network is also increasing rapidly, thereby consuming larger amounts of network resources. Also, at times, the network conditions may not be favorable for transferring video data from an edge device to the core network in near real-time.

Over a period of time, an edge device may use storage and network resources to store and transfer large amounts of similar video data. Similar video data refers to video data which, although not identical, may have similar content and which on being subjected to analytics operations at the core network may generate similar insights. Thus, similar video data may be considered as duplicate data for the purpose of the analytics operations. Similar video data is interchangeably referred to as similar data hereinafter.

While various video compression techniques may be used for reducing the size of a video stream in a temporal context, they are unable to account for semantic or contextual similarities in video streams spread across time. For example, a video stream received from an autonomous car on a particular trip may be compressed over the time duration of the trip by extracting the difference between successive frames and storing the incremental difference. However, if an autonomous car takes the same route on multiple occasions, such as between a home location and an office location of a user, the compressed video streams generated on the multiple occasions may include similar data that is systematically repeated across the compressed video streams. Comparing video streams across time durations to identify the similar data may not be feasible from both processing time and resource consumption perspectives.

Moreover, as the similar data may not be identical, block de-duplication techniques used for de-duplication of stored data at the edge device may not be effective for de-duplication of such video data. As a result, multiple instances of the similar data may get redundantly stored at the edge device, thereby consuming storage space inefficiently at the edge device.

The multiple instances of the similar data may also be transferred redundantly from the edge device to the core network, resulting in inefficient bandwidth usage. Also, repetitive analysis of the multiple instances of the similar data by analytics applications in the core network may consume processing resources without improving accuracy of the analytics operations.

The present subject matter describes techniques for transformation of video streams at an edge device based on semantic and contextual similarity of video segments spread across time. This enables storage of the video streams in a de-duplicated manner at the edge device and transmission of non-similar data to the core network. Thus, the present subject matter facilitates saving of storage space, reducing network bandwidth consumption, and reducing redundant processing of similar data at the edge device and core network without affecting the accuracy of analytics operations.

In one example, a plurality of segments may be extracted from a video stream received at an edge device and, for each segment, a matching segment may be searched for from among a plurality of stored segments. For this, a first signature of a segment of the video stream may be compared with a first level signature of each of the plurality of stored segments. In response to identifying a first set of similar segments from the stored segments, a second signature of the segment may be determined. Further, in response to identifying a second set of similar segments from the first set of similar segments based on the second signature, a matching segment may be ascertained from the second set of similar segments. The matching segment may then be provided for being stored in place of the segment, while the video stream is being stored in a storage medium, at the edge device.

The first level signature may be an approximate signature used to identify the first set of similar segments quickly and with minimal processing resources. A second level signature may be used for a near exact match determination from the first set of similar segments. Since the comparison for the near exact match is performed on a small set of similar segments, it can be performed with minimal time and processing overheads.

Further, as segments are replaced with matching segments, de-duplication techniques can be effectively applied to reduce the size of the video stream stored in the edge device. The reduced video data can be transmitted over a network to a core device for analytics. The core device can be understood to be a computing device or a group of computing devices in the core network where analytics operations, such as training and deep learning, are to be performed. Thus, the network bandwidth consumed for transferring video data can be reduced. Since the replacement of segments in the video stream with respective matching segments does not affect segments that are unique or non-similar when compared to the stored segments, the accuracy of the analytics operations performed at the core device is not affected.

In case no matching segment is found for a segment, the segment may be stored as it is in the storage medium. Further, in one example, the segment may also be added to the list of stored segments. Accordingly, the first signature of the segment may be stored with the first level signatures and the second signature of the segment may be stored with the second level signatures. Thus, over a period of time, a dictionary of non-similar stored segments associated with their respective first and second level signatures gets built.

In another example, the first and second level signatures may be a part of a storage de-duplication index used in the storage medium for applying de-duplication techniques. In one implementation, the video transformation and de-duplication instructions can directly replace the segment with a link to the matching segment, instead of storing the matching segment and subsequently de-duplicating it. Hence, in this example, the storage de-duplication index can be used for performing transformation and reduction by de-duplication in a single step and a separate dictionary may not be maintained.

In some example implementations, the present subject matter may use an existing video processing pipeline at the edge device for determining the first and second signatures and identifying the matching segment. For example, the edge device may include a video processing pipeline for analyzing a video stream to take driving decisions in real-time in case of an autonomous car. Hence, the analysis done in the video processing pipeline, such as object detection, velocity, motion estimation, semantic scene segmentation, and the like, may be used for the two-stage comparison based identification of matching segments, thereby reducing overheads on the edge device.

Thus, various aspects of the present subject matter provide for transformation of video streams for efficient storage and transfer. The following detailed description refers to the accompanying drawings. Wherever possible, the same reference numbers are used in the drawings and the following description to refer to the same or similar parts. While several examples are provided in the description, modifications, adaptations, and other implementations are possible. Accordingly, the proper scope of the disclosed examples may be defined by the appended claims.

FIG. 1 illustrates a first computing device 102, according to an example of the present subject matter. The first computing device 102 may be, for example, an edge device. Other computing devices, such as a core device and a source device, may be communicatively connected to the edge device, but are not shown in this figure.

In an example, the first computing device 102 may be an edge device, such as an edge server, an intelligent edge gateway, or a hyper converged Internet of Things (IoT) edge system disposed in a network environment. The first computing device 102 may be capable of hosting streaming platforms, hyper converged systems, and other processes or applications for storage and streaming of data. The first computing device 102 may receive a video stream from a source device (not shown in the figure). The source device may include a video capturing device, such as a vehicle mounted camera, a traffic camera, a surveillance camera, or the like. The first computing device 102 may communicate with the source device directly or over a network, such as a local area network (LAN). The communication may occur using wired or wireless communication protocols.

The first computing device 102 includes a processor 104 and a memory 106 coupled to the processor 104. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. As used herein, a memory may be any of Random Access Memory (RAM), volatile memory, non-volatile memory, flash memory, a storage drive (e.g., a hard disk drive (HDD)), a solid-state drive, any type of storage disc (e.g., a compact disc, a DVD, etc.), or the like, or a combination thereof.

The memory 106 stores instructions executable by the processor 104. The instructions, when executed by the processor 104, cause the processor 104 to intercept the video stream and obtain segments from the video stream. In one example, a segment may be a key frame of the video stream. In another example, to align frame boundaries with block boundaries used for de-duplication, snippets may be used instead of key frames.

For example, a segment may be a snippet that starts at a key frame and includes multiple key frames. A size of the snippet may be selected so as to ensure it is of sufficient length to exhibit temporal frame similarity. Thus, in case each segment corresponds to a snippet, the further processing, including similarity check and replacement, may be performed at the granularity of the snippet instead of frame granularity. This may help in more efficient de-duplication as will be discussed later.

The instructions further cause the processor 104 to search for a matching segment for each segment from among stored segments. In one example, the search for the matching segment is based on a two-stage comparison. In a first stage, a comparison of a first signature of a segment with a first level signature of each of the stored segments is performed to identify a subset of the stored segments that may be similar to the segment. The first signature may be an approximate signature that is based on summarized descriptors of the segment. As a result, the subset of the stored segments includes approximate matches that are likely to be similar to the segment. In case no approximate matches are found, it may be inferred that no matching segment exists.

In a second stage, a comparison of a second signature of the segment with a second level signature of each stored segment in the subset of stored segments is performed. The second signature may be based on detailed descriptors of the segment and can help in finding a near exact match from the subset of stored segments. In case no near exact match is found, it may be inferred that no matching segment exists. In one example, the second stage comparison may provide a second subset of stored segments corresponding to near exact matches. The matching segment may be then identified from the second subset of stored segments based on a rule.

While a two-stage identification of the matching segment has been discussed herein, it will be understood that in other implementations, additional stages of comparison may also be used, for example, based on the size of the video stream, desired speed and accuracy of detection of matching segment, and other such parameters.

The instructions further cause the processor 104 to provide the matching segment for being stored in place of the segment, while storing the video stream in a storage medium, when the matching segment is found to exist. As discussed herein, storing the matching segment in place of the segment may include providing a link to the matching segment in an index, such as a de-duplication index.

In case no matching segment is found to exist, the instructions cause the processor 104 to provide the segment as it is while storing the video stream in the storage medium. Thus, segments that do not match with a previously stored segment are provided for being stored in the storage medium, while segments that match with a previously stored segment are replaced by the previously stored segment.

In one implementation, the segment may be a key frame and the matching segment may be determined at the frame level. Once a matching segment is identified, the video stream may be split into snippets prior to storage so that snippet boundaries are aligned to block boundaries. In one example, the video stream may be split into snippets at the points of frame replacement. Such a splitting may be non-temporal and the resulting snippets may correspond to different time durations. In another example, the video stream may be split into snippets at candidate frame replacement boundaries and may contain a specified number of key frames for a certain time interval. As the size of a snippet may be substantially larger than the size of a frame, and the snippet boundary is aligned to block boundary in the storage medium, it can help in more efficient de-duplication subsequently.

A video stream in which one or more segments have been replaced by a corresponding matching segment may be referred to as a transformed video stream. As a result of the transformation, when de-duplication techniques are applied on the storage medium to index and remove duplicate data, the matching segments can be identified as duplicate data and can be effectively de-duplicated, thereby reducing the amount of storage consumed. De-duplicated data of a transformed video stream may be referred to as reduced video data.

In one example, de-duplication may be performed inline. For example, instructions to write the transformed video stream to a storage medium may be intercepted and may be de-duplicated before physical bits make their way to the storage medium. In another example, the transformed video stream may be stored in the storage medium and may be then de-duplicated.

In one example, the transformation and reduction of the video data may be performed in a single step, for example, when a de-duplication index is used for performing the transformation and reduction, as will be explained later.

In some example implementations, where the incoming video stream may have to be stored for future reference, the segments of the incoming video stream that were replaced may be saved separately in a low-cost storage tier, with an additional index.

Figure 2:
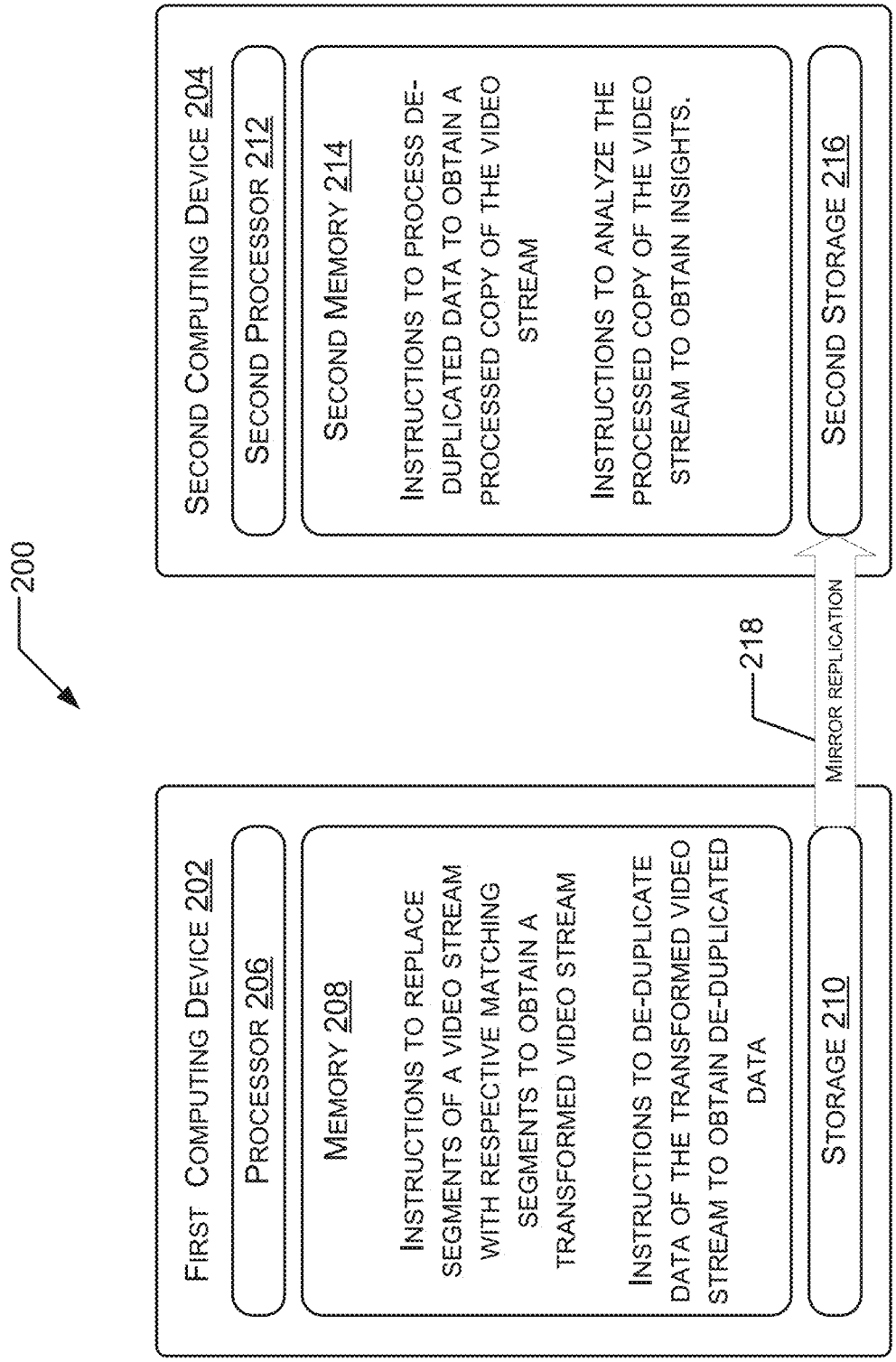
FIG. 2 illustrates a system environment for transformation of video streams, according to an example.

FIG. 2 illustrates a system environment 200 for transformation of video streams, according to an example. The system environment 200 includes a first computing device 202 communicatively connected to a second computing device 204. The first computing device 202 may be an edge device while the second computing device 204 may be a core device. A core device may be understood as a device or a group of devices that is part of a core network, such as in a cloud computing environment.

The first computing device 202 may include a processor 206, a memory 208, and a storage 210. Similarly, the second computing device 204 may include a second processor 212, a second memory 214, and a second storage 216. It will be understood that the first computing device 202 and the second computing device 204 may include additional components for their functioning though not explicitly disclosed herein. As used herein, a storage or storage medium may be any electronic, magnetic, optical, or other physical storage apparatus to contain or store information.

In one example, the memory 208 includes instructions that, when executed, cause the processor 206 of the first computing device 202 to replace segments of a video stream with respective matching segments to obtain and store a transformed video stream. As discussed with reference to FIG. 1 above, the transformed video stream may be obtained based on a two-stage comparison of each segment of the video stream with stored segments in the storage 210.

The first stage comparison for a segment may be based on a first signature that acts as a key for identifying similar segments from an index. In one example, the first signature of the segment may be obtained from a video processing pipeline in the first computing device 202, for example, as a coarse hash value or summarized descriptors based on object identification, location, velocity, and the like. In another example, the first signature may be a computed perceptual hash, such as a block mean value hash. A stored segment may be identified to be a similar segment for a segment when the first level signature of the stored segment matches with the first signature of the segment. Since the first signature is a coarse or an approximate signature, the similar segments identified from the index may be approximate matches for the segment.

The second stage comparison may be then performed on the identified similar segments based on a second signature of the segment. The second signature may act as an additional key to the index to identify near exact matches from the similar segments. In one example, a similar segment may be identified to be a near exact match when a difference value between the second level signature of the similar segment and the second signature of the segment may be less than a threshold. In another example, a similar segment may be identified to be a near exact match when a similarity value between the second level signature of the similar segment and the second signature of the segment may be more than a threshold.

In one example, the second signature of the segment is also obtained from the video processing pipeline, for example, based on detailed descriptors such as global image features. In another example, the second signature may be computed from a spatial envelope representation of the segment. The second stage comparison provides a second set of similar segments, also referred to as near exact matches. The second set of similar segments may include one or more near exact matches.

A matching segment may be ascertained from the second set of similar segments identified as near exact matches based on a rule. For example, a similar segment for which the difference value between the second signature of the segment and a corresponding signature of the similar segment is the least may be selected as the matching segment. In another example, a chronologically most recent similar segment may be selected as the matching segment. In yet another example, the first similar segment to be identified as a near exact match may be selected as the matching segment. The rule to be used for ascertaining the matching segment from the near exact matches may be selected based on desired speed and accuracy and the field of application, such as video surveillance or autonomous driving, and the like.

In one example, the index used for identifying the similar segments and the near exact matches may be an index of a dictionary of stored segments. In another example, the index may be a part of a de-duplication index of the storage 210. For example, the de-duplication index may include special type fields where the summarized and detailed descriptors or hash values of stored segments are stored for the first stage comparison and the second stage comparison, respectively. Thus, a single index may be used for both transformation of video streams and de-duplication.

The memory 208 may further include instructions that cause the processor 206 to de-duplicate data in the storage 210. In one example, a deduplication technique used may depend on the technology type of the storage 210, such as block, file, or object deduplication. In one example, inline de-duplication techniques may be used. On de-duplication, reduced video data may be obtained corresponding to the transformed video stream. The reduced video data may be transferred to the second storage 216 of the second computing device 204, for example, when a mirror replication process 218 is performed.

It will be understood that the mirror replication process 218 may be performed for transfer of de-duplicated data from the first computing device 202 to the second computing device 204 at the storage layer level for efficient data transfer. In one example, the mirror replication process 218 is WAN efficient, i.e. it does not send data across to the second computing device 204, even if it is a duplicate of data that was previously transferred much earlier, for example, a number of days before a current data transfer.

The second memory 214 at the second computing device 204 includes instructions that when executed cause the second processor 212 to process the reduced video data to obtain a processed copy of the video stream and to analyze the processed copy of the video stream to obtain insights. In one example, processing the reduced video data may include stitching together the various segments of the reduced video data and smoothing transitions between the various segments.

For example, a second index, such as a de-duplication index, may be stored in the second computing device 204. The second index can correspond to the index used at the first computing device 202 to reduce the incoming video stream. Hence, using the second index, the various segments in the reduced video data can be put together or stitched together to obtain the transformed video stream at the second computing device 204. Since some segments of the incoming video stream were replaced with matching segments at the first computing device 202, there may be jerks at the points of replacement, which may be made smooth using smoothing techniques to obtain the processed copy of the video stream, also referred to as processed video.

In one example, if the entire video stream is to be replayed at the second computing device 204 for analysis, contextual adjustments related to geographic location, weather, season, illumination, etc. could be made during the processing to reduce jerkiness due to the segment replacement and to enhance viewing experience. In another example, where the video stream may be analyzed without replaying, for example, for deep learning or training, the processed video may be shorter and may include the most informative or non-similar parts of the video stream from a model building perspective. Since the reduced video data includes the unique or non-similar data in the video stream, the accuracy of the analysis is not affected.

Transformation of video streams is further explained with reference to an example implementation in the field of autonomous driving with reference to FIG. 3. It will be understood that similar implementations would be possible in other fields of application, such as surveillance, home automation, and the like.

Figure 3:
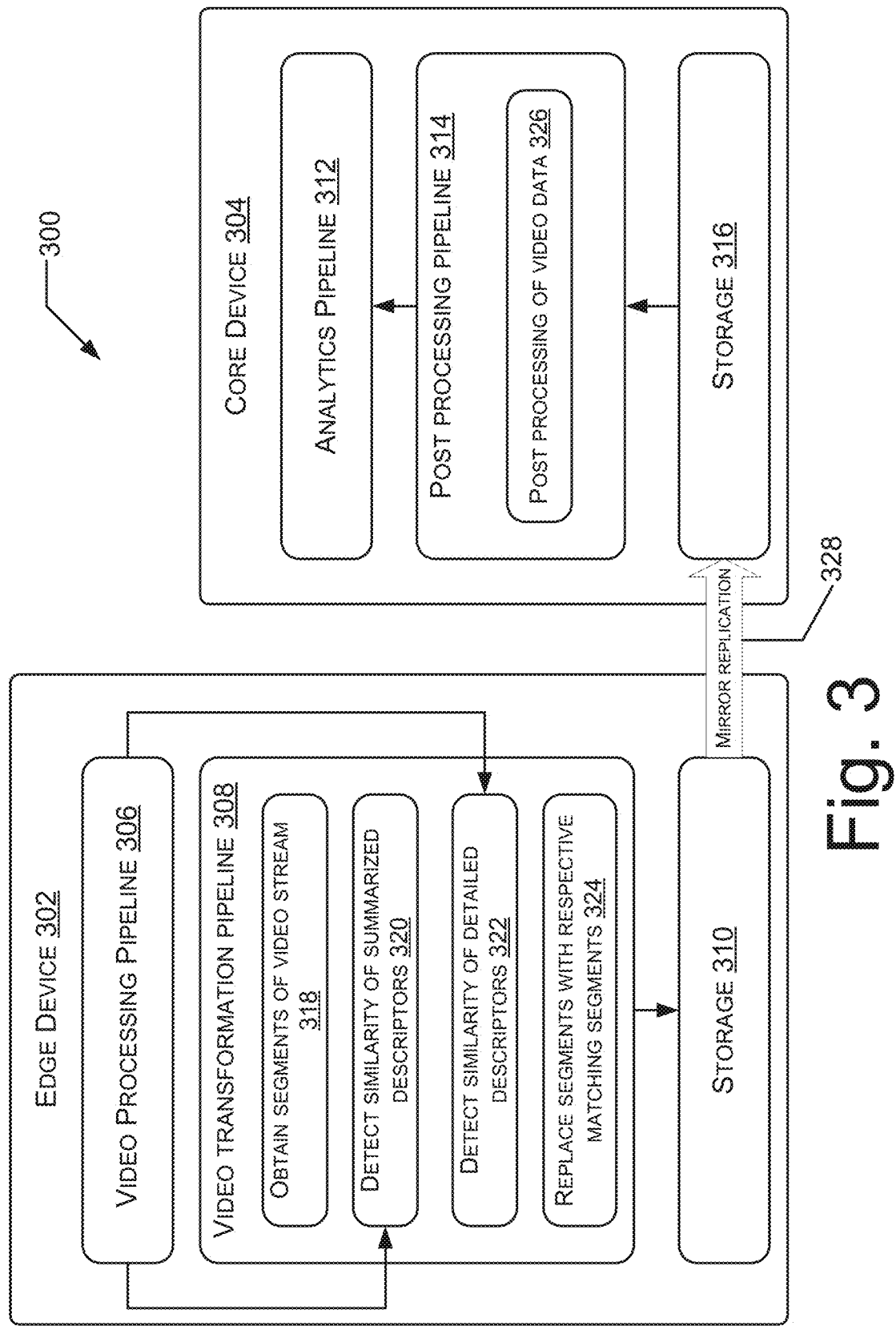
FIG. 3 illustrates a system environment for transformation of video streams, according to an example.

FIG. 3 illustrates a system environment 300 for transformation of video streams, according to an example. System environment 300 includes an edge device 302 that may be communicatively connected to a core device 304 over a network (not shown). The edge device 302 and the core device 304 can include various components, such as processor, memory, interfaces, and the like, which are not shown for brevity.

The edge device 302 may be implemented in an autonomous car and may receive a video stream from a camera mounted on the autonomous car. As understood, autonomous cars may have multiple cameras that generate video streams of their respective surrounding environment and provide the video streams to the edge device 302. The video streams may be analyzed at the edge device 302 for taking driving decisions, such as to change speed or direction, in real time. On receipt of a video stream at the edge device 302, a video processing pipeline 306 processes the video stream to facilitate the decision making.

The video processing pipeline 306 includes a set of instructions to process the video stream to be able to understand the surrounding environment. The set of instructions can include, for example, instructions for segmenting the video stream and performing object detection, semantic segmentation, GIST descriptors identification, simultaneous localization and mapping (SLAM), and the like for each segment.

A video transformation pipeline 308 in the edge device 302 includes a set of instructions to transform the video stream to make it suitable for de-duplication for efficient storage and transfer. In one example, the video transformation pipeline 308 can intercept the segments and can leverage the processing performed in the video processing pipeline 306 for transformation of the video stream. In one example, object identification performed in the video processing pipeline 306 is used for obtaining the first signature for the first-stage approximate comparison and GIST descriptors identification performed in the video processing pipeline 306 is used for obtaining the second signature for the second-stage near exact comparison.

In one example implementation, segments, such as key frames or snippets, are extracted from the video stream at block 318. A segment that is extracted from the video stream is also referred to as an incoming segment.

At block 320, summarized descriptors, such as a combination of Mobilenet Caffe model for object identification are obtained from the video processing pipeline 306 and are compared with indexed summarized descriptors of stored segments for the first stage approximate comparison. The object identification may include the approximate position of the object as well. In one example, a dictionary key of <Object name, position, velocity> tuples is created based on the Mobilenet Caffe model and corresponds to the summarized descriptors. In the tuple, the approximate position may be expressed in terms of quadrant for approximate comparison. In one example, multiple tuples (e.g., <object name, position, velocity>) may be present in a single frame. Hence, a key string can be created by listing the tuples in a frame in a sorted order by object name. Thereafter, the dictionary generates an index to quickly lookup these key strings. In such a case the key string acts as the key for lookup. Thus, the key identified for the incoming segment corresponds to the first signature, while the keys present in the dictionary for the stored segments correspond to the first level signatures.

From the first stage comparison, a first set of similar segments are identified if a match is found for the first signature among the first level signatures. If no match is found, the incoming segment is stored in the storage 310 and its summarized and detailed descriptors are added to the dictionary. Thus, the dictionary gets populated over time with non-similar segments and corresponding keys.

At block 322, detailed descriptors, such as GIST descriptors, are obtained from the video processing pipeline 306 and are compared with indexed detailed descriptors of similar segments in the first set of similar segments, for the second stage comparison, to identify near exact matches. In one example, the detailed descriptors provide an estimation of the structure of a scene in a segment, for example, by the mean of global image features, and provide a statistical summary of the spatial layout properties based on Spatial Envelope representation of the scene. The detailed descriptors identified for the incoming segment correspond to the second signature, while the detailed descriptors present in the dictionary for the stored segments correspond to the second level signatures.

In one example, if the difference value between the second signature of the incoming segment and the second level signature of a similar segment in the first set of similar segments is less than a threshold value, then the similar segment is considered to be a match. Thus, from the second stage comparison, a second set of similar segments are identified if a match is found for the second signature among the second level signatures. If no match is found, the incoming segment is stored in the storage 310 and its summarized and detailed descriptors are added to the dictionary to build the dictionary with non-matching segments.

In case the second set of similar segments includes a plurality of similar segments, a matching segment is identified from the plurality of similar segments based on a rule as discussed earlier. The incoming segment is then replaced by the matching segment and stored in the storage 310. Thus, contextual and semantic similarity between the incoming segment and stored segments is accounted for while identifying the matching segment. The received video stream is thus transformed and stored in the storage 310 at the edge device 302.

Using the video processing pipeline 306 to derive the first signature helps in minimizing processing overhead and helps to make the processing resources, which would otherwise have been used in computing the first signature, available to an analytics pipeline 312 at the edge device 302. Further, by deriving the second signature from the existing pipeline it can be ensured that semantic comparison for the second signature acts on frames that have similar features as relevant for the analytics objectives, which helps improve accuracy.

For example, the video processing pipeline 306 at the edge device 302 may be optimized to recognize descriptors of features in a scene that are relevant to autonomous driving and ignore the irrelevant features. This would help the edge device 302 make better real-time decisions for autonomous driving. In addition, it would ensure that the second signature derived from the video processing pipeline 306 includes descriptors of the features relevant to autonomous driving. As a result, replacement of a segment may occur when the segment has semantically duplicate information in the context of autonomous driving. On the other hand, the segments that have additional semantic information relevant for autonomous driving may not be replaced and hence, may be made available for analytics operations, thereby improving the accuracy.

In one example, when the segment to be replaced is a frame, then, upon replacement of the frame with the matching segment, the video stream may be split into snippets for storing in the storage 310. The matching segment that replaces a key frame may also be referred to as a replaced frame. In one example, a snippet may start at a boundary of a replaced frame and may end at a boundary of the next replaced frame. In another example, the snippet may include a specified number of key frames, including replaced frames and non-replaced frames, for a certain time interval.

Further, de-duplication techniques may be applied on the storage 310 to remove duplicate data. In one example, de-duplication may be performed inline, for example, by intercepting write instructions before the transformed video stream is stored. During de-duplication, the matching segments may be identified as duplicate data and may be de-duplicated to obtain reduced video data. In one example, de-duplication may be performed at a chunk level where size of a chunk may be, for example, about 4 KB. However, the segment of the video stream that is replaced and stored in the storage 310 may be of larger size, for example about 50 KB. Hence, efficiency of de-duplication obtained may be increased since a plurality of chunks would get de-duplicated. The reduced video data thus stored in the storage 310 of the edge device 302 may be transferred to the storage 316 of the core device 304 during execution of a mirror replication process 328.

The post processing pipeline 314 at the core device may include instructions for processing the reduced video data. The post processing pipeline 314 may obtain the reduced video data from the storage 316 and perform post-processing at block 326 to generate processed video data. The post-processing may be performed to make the reduced video data suitable for analysis, such as by stitching segments, smoothing transition, and the like. The analytics pipeline 312, which may include instructions for performing analytics operations, such as deep learning, training, and the like, may then use the processed video data to obtain insights. The insights may correspond to actions to be taken for enhanced autonomous driving experience, such as, through better control of steering and throttling, better route navigation, and the like.

The transformation and reduction of a video stream using a dictionary and/or de-duplication index, as performed by, for example, devices 102, 202, or 302 described above, will be explained using examples with reference to FIGS. 4A, 4B, and 5. The dictionary and de-duplication index illustrated in these figures are merely abstract representations and the actual implementations may differ in form, content, and structure. For discussion purposes and ease of understanding, in these examples, it is considered that one segment corresponds to one data block. In different implementations, a segment may span many data blocks and accordingly, the information stored in the dictionary and the de-duplication index may be modified.

FIG. 4A illustrates transformation of a video stream using a dictionary, according to an example. For example, segments S1, S2, S3, and S4 may be obtained from an incoming video stream 402 and may be stored in a storage medium 404 after undergoing a process of transformation 406 using a dictionary 408. For example, using the dictionary 408, it may be determined that previously stored data block A is a near exact match for segment S1, previously stored data block B is a near exact match for segment S2, and previously stored data block D is a near exact match for segment S4. Further, it may be determined that S3 does not have a near exact match among the stored data blocks.

In one example, the dictionary 408 includes the first level signatures, the second level signatures, a data block location with offset, and a data block identifier to help identify the near exact match. Hence, for example, for segment S1, it may be determined that the first signature of S1 matches with the First Hash 1. Hence, the data blocks A, B, and C, which have First Hash 1 as their first level signature may be identified as approximate matches. The second signature of S1 may then be compared with the second level signatures of A, B, and C as described earlier. Thereafter, it may be determined that A is a matching segment for S1. Hence, when storing the segment S1 in the storage medium 404, S1 may be replaced by A, shown as data block S1A.

Similarly, instead of S2 and S4 data blocks S2B and S2D may be stored respectively, where S2B is identical to B and S4D is identical to D. As shown, the storage medium 404 also includes the previously stored segments/data blocks A, B, C . . . N. Further, as S3 is a non-similar segment, i.e., does not have a corresponding matching segment from among stored segments, it may be stored as it is in the storage medium 404 and a corresponding entry may be included in the dictionary 408.

In the example, illustrated, it is considered that the first signature of S3 matches with the First hash 2, however, no near exact match is found based on the second signature of S3. However, in other examples, the non-similar segment may have a non-matching first signature as discussed earlier.

Further, on storage of the blocks S1A, S2B, S3, and S4D in the storage medium 404, a corresponding entry is also made in a de-duplication index 410. In one example, the de-duplication index 410 includes file index 412 and data block index 414. The file index 412 includes listing of the component data blocks for each file, while the data block index 414 includes the de-duplication hash (dedup hash) and data block location for each data block.

Since block S1A is identical to A, it would have the same dedup hash as A. Similarly, S2B has the same dedup has B and S4D has the same dedup hash as D. However, data block S3 has a different dedup hash as shown. Subsequently, on applying de-duplication techniques to the storage medium 404, the data blocks with the same dedup hash would get de-duplicated as shown in FIG. 4B.

Figure 4B:
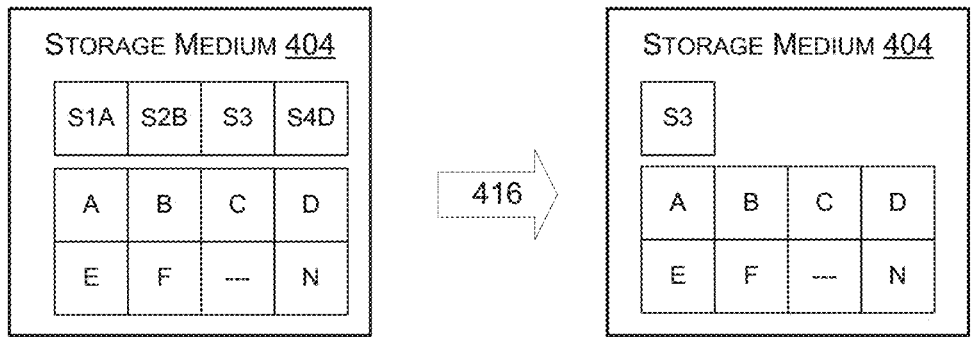
FIG. 4B illustrates de-duplication of a transformed video stream, according to an example.
Figure 4B:
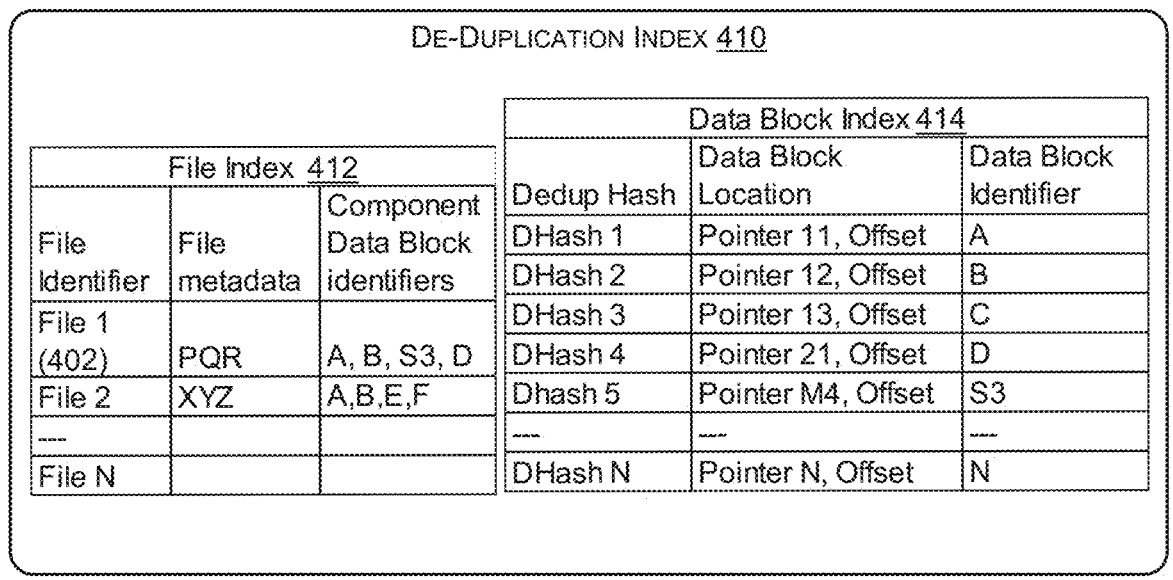

FIG. 4B illustrates de-duplication of a transformed video stream, according to an example. De-duplication techniques 416 can be applied on the storage medium 404. Accordingly, the segments S1A, S2B, and S4D would be removed from the storage medium as they are duplicates of previously stored segments/data blocks A, B, and D respectively. Accordingly, the de-duplication index 410 gets updated so that the file index 412 now refers to A, B, and D instead of S1A, S2B, and S4D. Further, the entries corresponding to S1A, S2B, and S4D get removed from the data block index 414. However, the references to S3 remain in the file index 412 and the data block index 414. Thus, the incoming video stream 402 gets stored efficiently in the storage medium 404 and can be further transferred in a WAN efficient manner to a core device as discussed earlier.

While in FIGS. 4A and 4B, it has been illustrated that S1A, S2B, S4D may be stored in the storage medium 404 prior to de-duplication, in some implementations, S1A, S2B, and S4D may not be physically materialized but may be de-duplicated inline. For example, the write instruction to storage medium 404 may be intercepted and data may be de-duplicated before physical bits make their way to the storage medium 404. Hence, while the transformation and reduction (de-duplication) may occur in two steps, in the storage medium 404 the reduced video stream data may be stored directly.

Also, in some example implementations, though not described herein, the segments S1, S2 and S4 of the incoming video stream 402 that were transformed by replacement with respective matching segments may also be saved separately in a low-cost storage tier separate from the storage medium 404 for future reference, with an additional index.

Figure 5:
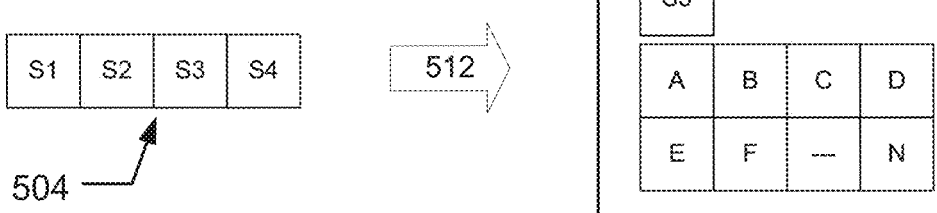
FIG. 5 illustrates transformation and de-duplication of a video stream using a de-duplication index, according to an example.

FIG. 5 illustrates transformation and de-duplication of a video stream using a de-duplication index 502, according to an example. For example, the de-duplication index 502 may be used for single step transformation and reduction of an incoming video stream 504 to be stored in a storage medium 506.

The de-duplication index 502 may include a file index 508 and a data block index 510. The file index 508 includes listing of the component data blocks for each file stored in the storage medium 506, while the data block index 510 includes the first level signature, second level signature, and data block location for each data block. In addition, though not shown, the data block index 510 may also include de-duplication hash (dedup hash) for each data block stored in the storage medium 506.

In one example, the segments S1, S2, S3, and S4 may be received for the incoming video stream 504 and the transformation and reduction process 512 may be performed for each segment. For example, for segment S1, the first signature of S1 may be found to match with the First Hash 1 in the data block index 510 and accordingly, blocks A, B, and C may be identified as approximate matches. Further, data block A may be identified as a matching segment for S1 based on the second signature of S1 and the second level signatures in the data block index 510. Hence, instead of storing S1 in the storage medium 506, a reference to A may be included in the file index 508. Similarly, a reference to matching segment B may be included instead of S2 and a reference to matching segment D may be included instead of S4 in the file index 508.

Further, S3 may be stored in the storage medium 506 and an entry corresponding to S3 may be included in the data block index 510 and the file index 508 when it is determined that there is no matching segment for S3 from among the previously stored data blocks/segments. Thus, in the example illustrated in FIG. 5 the transformation and reduction or de-duplication may be performed in a single step.

Figure 6:
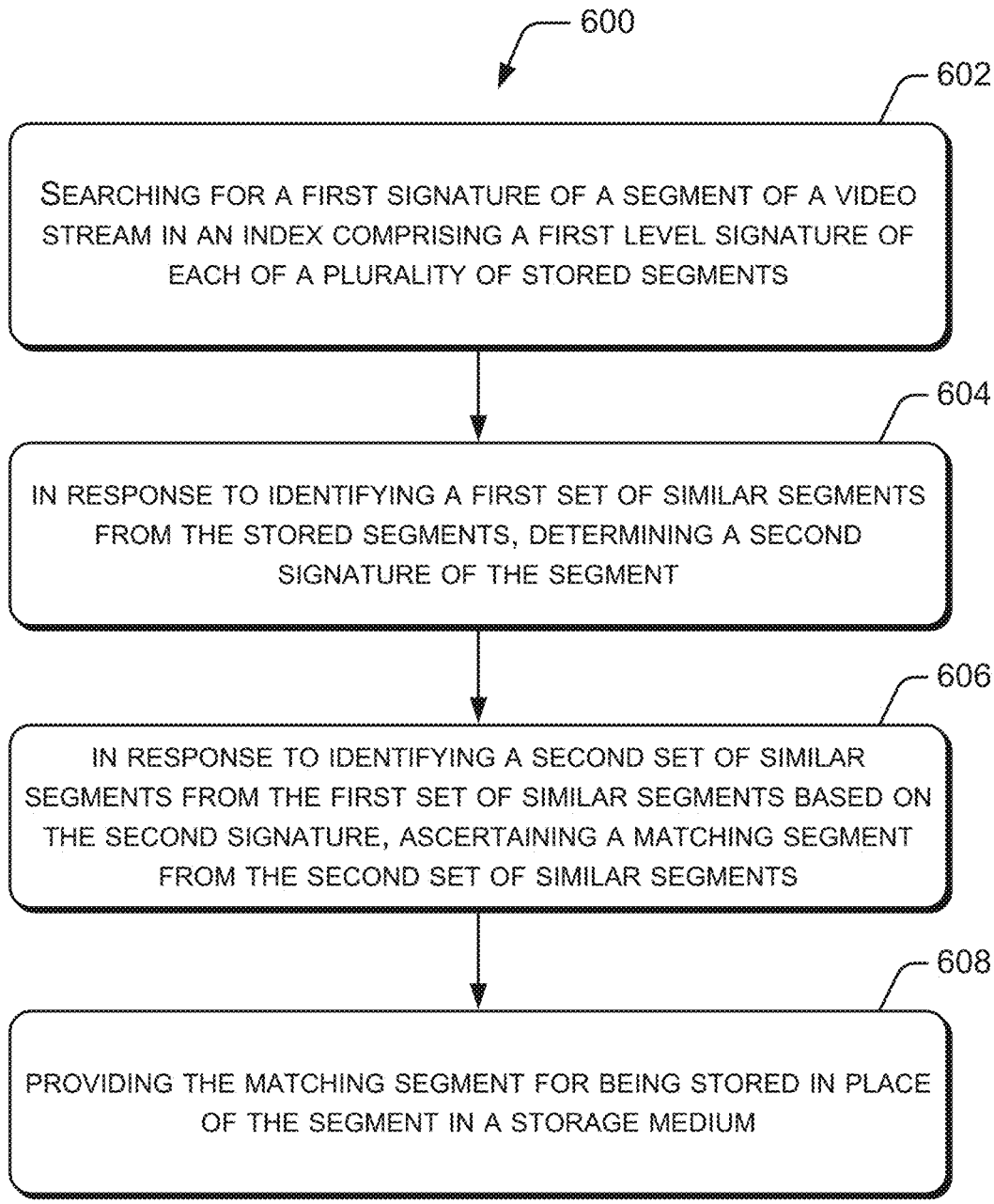
FIG. 6 illustrates a method for transformation of video streams, according to an example.
Figure 7:
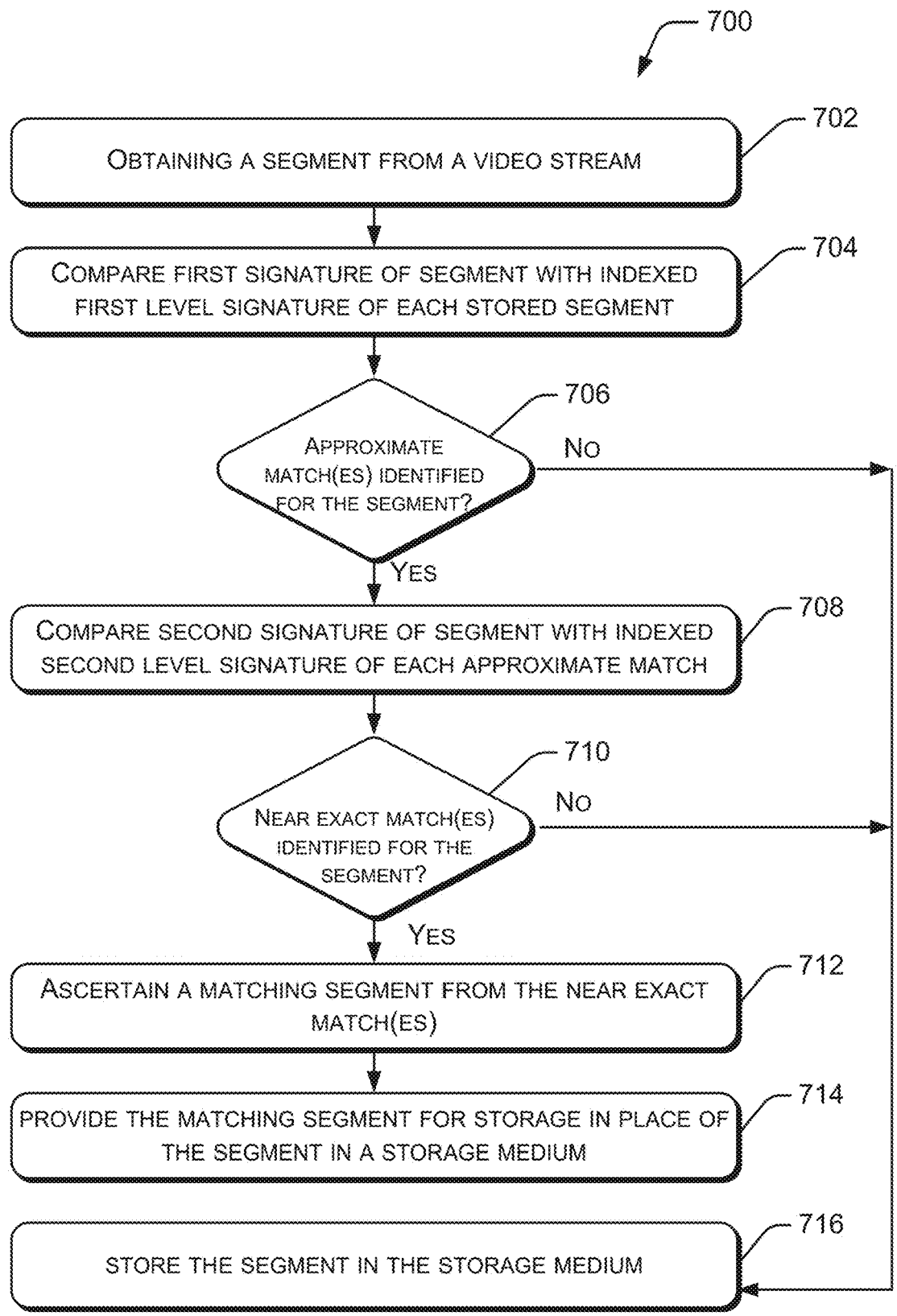
FIG. 7 illustrates a method for transformation of video streams, according to an example.

FIGS. 6 and 7 illustrate methods 600 and 700, respectively for transformation of video streams, according to an example. The methods 600 and 700 can be implemented by processing resource(s) or computing device(s) through any suitable hardware, a non-transitory machine readable medium, or combination thereof. Further, although the methods 600 and 700 are described in context of the aforementioned devices 102 or 202 or 302, other suitable systems may be used for execution of the methods 600 and 700. It may be understood that processes involved in the methods 600 and 700 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Methods 600 and 700 may be performed on each segment obtained from a video stream to replace the segment with a matching segment from among stored segments, where the matching segment is a near exact match of the segment. In cases where the segment does not have a near exact match, it is not replaced. As a result, a segment that was originally a near exact match to a stored segment, but could not be de-duplicated since it was not an exact replica, is made the same as the stored segment and hence can be de-duplicated. At the same time, as segments that were non-similar to any stored segment are not replaced, the additional information provided by such non-similar segments is retained in the course of transformation and can be used in analytics operations.

Referring to method 600, at block 602, a first signature of a segment of a video stream is compared with a first level signature of each of a plurality of stored segments. The first signature may be an approximate signature computed based on summarized descriptors, such as object identification, approximate location, and the like. Similarly, the first level signature of a stored segment may be an approximate signature of the stored segment. Hence, a match between the first signature and the first level signature indicates that the stored segment may be an approximate match for the segment. Thus, a first set of similar segments may be identified based on the comparison.

At block 604, in response to identifying a first set of similar segments from the stored segments based on the comparing, a second signature of the segment is determined. The second signature may be based on detailed descriptors, such as spatial envelope representation of a scene in the segment, and may be used for identifying near exact matches from among the first set of similar segments. Thus, a second set of similar segments may be identified based on the second signature.

At block 606, in response to identifying a second set of similar segments from the first set of similar segments based on the second signature, a matching segment is ascertained from the second set of similar segments. For example, in case the second set of similar segments has a plurality of similar segments, the matching segment may be identified based on a rule. In another example, the similar segment first identified to be a near exact match may be ascertained to be the matching segment. This may help in increasing the speed of identification of the matching segment.

At block 608, the matching segment is provided for being stored in place of the segment in a storage medium. Thus, the segment gets replaced by the matching segment.

Referring to method 700, at block 702, a segment is obtained from a video stream. The video stream may be received or generated by an edge device. For example, the segment may be obtained from a video processing pipeline that processes the video stream at the edge device or may be extracted from the video stream. In one example, the segment may be a key frame. In another example, the segment may be a snippet that includes a plurality of key frames.

At block 704, a first signature of the segment is compared with a first level signature of each stored segment, the first level signatures being present in an index. The first signature and the first level signatures may be approximate signatures. The index of first level signatures may be a dictionary index in one example. In another example, the index may be a de-duplication index used for de-duplicating a storage medium in the edge device.

At block 706, it is determined if one or more approximate matches are identified for the segment. For example, when one or more first level signatures match with the first signature, the corresponding stored segments may be considered to be approximate matches for the segment.

If no approximate match is determined for the segment, the method skips to block 716, where the segment is stored in the storage medium and its first and second level signatures are indexed for future reference.

If one or more approximate matches are determined, then the method progresses to block 708, where a second signature of the segment is compared with a second level signature of each approximate match, the second level signatures also being present in the index where the first level signatures are present. The second signature and the second level signatures may be specific signatures used for near exact match comparison.

At block 710, it is determined if one or more near exact matches are identified for the segment. For example, when a difference between the second signature and one or more second level signatures is less than a threshold, the corresponding stored segments may be considered to be near exact matches for the segment.

If no near exact match is determined for the segment, the method skips to block 716, where the segment is provided for being stored in the storage medium and its first and second level signatures are indexed for future reference.

If one or more near exact matches are determined, then the method progresses to block 712, where a matching segment is ascertained from the near exact matches. In one example, the first approximate match to be determined to be a near exact match may be considered to be the matching segment. In another example, the near exact match for which the difference between the second signature and the second level signature is the least may be considered to be the considered to be the matching segment. In yet another example, the near exact match which is chronologically the most recent stored segment may be considered to be the matching segment.

At block 714, the matching segment may be provided for being stored in place of the segment in the storage medium. Thus, the video stream may be transformed and made suitable for de-duplication. As a result, on de-duplication of the storage medium, the amount of data in the storage medium corresponding to the video stream can be reduced. In one example, the de-duplication may be performed inline, before the transformed video stream is stored in the storage medium.

Figure 8:
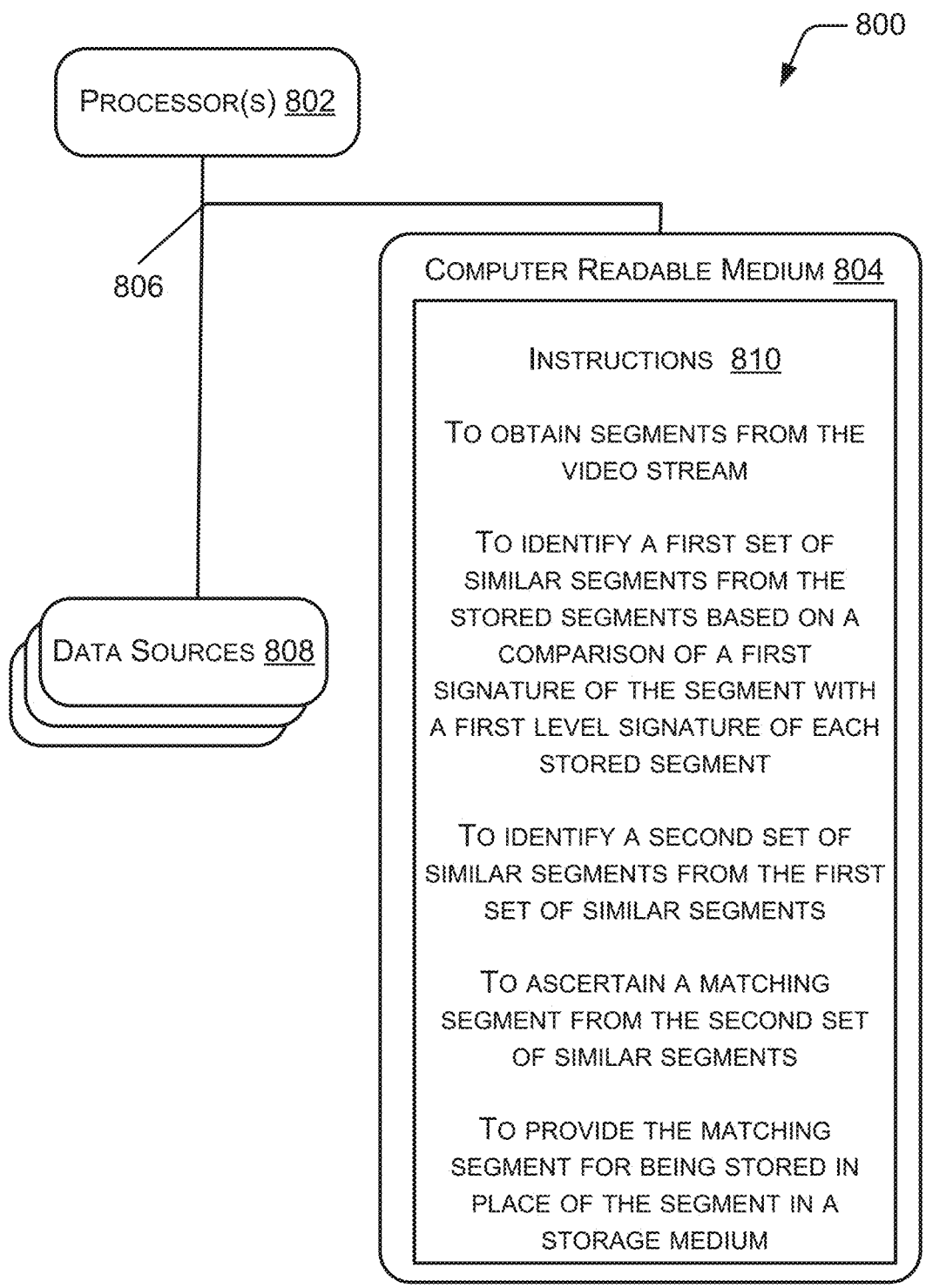
FIG. 8 illustrates a system environment implementing a non-transitory computer readable medium for transformation of video streams, according to an example.

FIG. 8 illustrates a system environment 800 implementing a non-transitory computer readable medium for transformation of a video stream, according to an example.

In an example, the system environment 800 includes processor(s) 802 communicatively coupled to a non-transitory computer readable medium 804 through a communication link 806. In an example implementation, the system environment 800 may be a computing device, such as an edge device 102 or 202 or 302. In an example, the processor(s) 802 may have one or more processing resources for fetching and executing computer-readable instructions from the non-transitory computer readable medium 804.

The non-transitory computer readable medium 804 can be, for example, an internal memory device or an external memory device. In an example implementation, the communication link 806 may be a direct communication link, such as any memory read/write interface.

The processor(s) 802 and the non-transitory computer readable medium 804 may also be communicatively coupled to data sources 808 over the network. The data sources 808 can include, for example, memory of the device, such as the edge device 102 or 202 or 302.

In an example implementation, the non-transitory computer readable medium 804 includes a set of computer readable instructions which can be accessed by the processor(s) 802 through the communication link 806 and subsequently executed to perform acts for transformation of a video stream.

Referring to FIG. 8, in an example, the non-transitory computer readable medium 804 includes instructions 810 that cause the processor(s) 802 to obtain segments from the video stream, each segment being one of a key frame and a snippet. Further, the instructions 810 cause the processor(s) 802 to identify a matching segment for each segment. For this, a first set of similar segments may be identified from the stored segments based on a comparison of a first signature of the segment with a first level signature of each stored segment.

When the first set of similar segments includes at least one stored segment, a second set of similar segments may be identified from the first set of similar segments. In one example, a similar segment of the first set of similar segments is selected to be in the second set of similar segments when a difference value obtained on comparison between a second signature of the segment and a second level signature of the similar segment is less than a threshold.

When the second set of similar segments includes at least one similar segment, a matching segment may be ascertained from the second set of similar segments. The matching segment may then be provided for being stored in place of the segment in a storage medium. In one example, to store the matching segment, a link to the matching segment may be stored.

In one implementation, the storage medium may be de-duplicated to obtain de-duplicated data corresponding to the video stream. Further, the de-duplicated data may be transferred to another storage medium over a network.

In one implementation, the matching segment may be selected from the second set of similar segments based on a rule when the second set of similar segments comprises a plurality of similar segments. For example, the rule may include selecting the similar segment for which a difference value between the second level signature of the similar segment and the second signature is the least, in comparison to corresponding difference values for other similar segments in the plurality of similar segments, as the matching segment. In another example, the rule may include selecting a chronologically most recent similar segment from the plurality of similar segments as the matching segment.

In one implementation, the segment may be stored in the storage medium when no stored segment is selected to be in the first set of similar segments or no similar segment is selected to be in the second set of stored segment. Accordingly, the first signature and the second signature may be stored in an index comprising first level signatures and second level signatures. As discussed earlier, the index may be a dictionary or a de-duplication index of the storage medium.

Thus, the present subject matter can help in reduction of video data for efficient storage and transfer. The transformation of video streams for reduction of video data goes beyond temporal context and takes into account contextual and semantic similarity and makes semantically similar data to be exactly similar. Further, existing video processing pipeline can be leveraged to detect semantic similarity in video streams and avoid overheads. Furthermore, the multi-stage comparison based transformation reduces processing cost for detecting semantic redundancy in video streams.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
    searching, at an edge device, for a first signature of a segment of a video stream in an index on the edge device to identify a first set of similar segments, the index comprising a first level signature of each of a plurality of stored segments;
    in response to identifying the first set of similar segments from the stored segments, determining, by the edge device, a second signature of the segment;
    identifying, by the edge device, a second set of similar segments from the first set of similar segments based on a comparison of the second signature of the segment to a second level signature of each of the first set of similar segments;
    ascertaining, by the edge device, a matching segment from the second set of similar segments; and
    providing, by the edge device, the matching segment for being stored in place of the segment in a storage medium on the edge device,
    wherein the first level signature of each of the plurality of stored segments, the second level signature of each of the first set of similar segments, and the plurality of stored segments are stored on the edge device previously to and separate from the video stream.

2. The method of claim 1, wherein
    the first signature is based on summarized descriptors of a scene in the segment and the first set of similar segments includes similar segments that are approximate matches for the segment; and
    the second signature is based on detailed descriptors of the scene in the segment and the second set of similar segments includes the similar segments that are near exact matches for the segment.

3. The method of claim 1, wherein a similar segment of the first set of similar segments is selected to be in the second set of similar segments when a difference value obtained on comparison between the second signature of the segment and a second level signature of the similar segment is less than a threshold.

4. The method of claim 1, wherein ascertaining the matching segment comprises selecting the matching segment from the second set of similar segments based on a rule when the second set of similar segments comprises a plurality of similar segments, and
    wherein the rule includes:
        selecting, as the matching segment, a similar segment for which a difference value between a second level signature of the similar segment and the second signature is the least; or
        selecting, as the matching segment, a chronologically most recent similar segment from the plurality of similar segments as the matching segment.

5. The method of claim 1, comprising intercepting the video stream and obtaining segments from the video stream, wherein each segment is one of a snippet and a key frame, and wherein the snippet includes multiple key frames.

6. The method of claim 1, comprising obtaining the first signature and the second signature for the segment from a video processing pipeline of the edge device.

7. The method of claim 1, wherein the index is one of a dictionary of first and second level signatures associated with corresponding stored segments, and a de-duplication index of the storage medium.

8. The method of claim 1, further comprising:
de-duplicating, at the edge device, the storage medium to obtain de-duplicated data that includes a reduced video stream, the reduced video stream resulting from de-duplication of segments of the video stream that were replaced by matching previously stored segments; and
transfer, by the edge device, the de-duplicated data to another storage medium on a core computing device via mirror replication.

9. A computing device comprising:
a processor;
a storage medium; and
a memory coupled to the processor, the memory storing instructions executable by the processor to:
intercept a video stream and obtain segments from the video stream; and
for each segment obtained from the video stream,
search for a matching segment from among stored segments, the search being based on a comparison of a first signature of the segment with a first level signature of each of the stored segments to identify a subset of the stored segments and based on a comparison of a second signature of the segment with a second level signature of each of the subset of the stored segments, wherein the first signature is based on summarized descriptors of the segment and the second signature is based on detailed descriptors of the segment;
store the matching segment in place of the segment in the storage medium when the matching segment is found; and
provide the segment for being stored in the storage medium when no matching segment is found,
wherein the first level signature of each of the stored segments, the second level signature of each of the subset of the stored segments, and the stored segments are stored in the storage medium previously to and separate from the video stream being intercepted.

10. The computing device of claim 9, wherein to store the matching segment in place of the segment, a link to the matching segment is stored.

11. The computing device of claim 9, wherein, to search for the matching segment from among stored segments, the memory further stores instructions executable by the processor to:
compare the first signature of the segment with a first level signature of each of the stored segments;
identify a first set of similar segments from the stored segments as the subset of the stored segments, wherein a stored segment is selected to be in the first set of similar segments when the first signature matches with a first level signature of the stored segment;
compare the second signature of the segment with a second level signature of each similar segment of the first set of similar segments;
identify a second set of similar segments from the first set of similar segments based on the second signature, wherein a similar segment of the first set of similar segments is selected to be in the second set of similar segments when a difference value obtained on comparison between the second signature of the segment and the second level signature of the similar segment is less than a threshold; and
ascertain the matching segment from the second set of similar segments,
wherein the matching segment is ascertained based on a rule when the second set of similar segments includes a plurality of similar segments.

12. The computing device of claim 9, wherein the memory storage medium further stores an index of first level signatures and second level signatures, wherein the index is one of a dictionary of the stored segments and a de-duplication index of the storage medium,
and wherein the first level signatures and the second level signatures include hashes.

13. The computing device of claim 12, wherein the memory further stores instructions executable by the processor to store the first signature and the second signature of the segment in the index when no matching segment is found.

14. The computing device of claim 9, wherein the memory further stores instructions corresponding to a video processing pipeline that is executable by the processor to process the video stream for decision making at the computing device, and
wherein the segment, the first signature, and the second signature are obtained from the video processing pipeline.

15. The computing device of claim 9, wherein the memory further stores instructions executable by the processor to:
de-duplicate the storage medium to obtain de-duplicated data corresponding to the video stream, the storage medium being at an edge device; and
send the de-duplicated data from the edge device to another storage medium on a core computing device.

16. The computing device of claim 9, wherein the processor, the storage medium, and the memory are included in an autonomous car, and
the video stream is generated by a camera of the autonomous car.

17. A non-transitory computer-readable medium comprising computer-readable instructions for transformation of a video stream, the computer-readable instructions when executed by a processor cause the processor to:
obtain segments from the video stream, each segment being one of a key frame and a snippet; and
for each segment:
identify a first set of similar segments from among stored segments based on a comparison of a first signature of the segment with a first level signature of each of the stored segments;
when the first set of similar segments includes at least one stored segment, identify a second set of similar segments from the first set of similar segments, wherein a similar segment of the first set of similar segments is selected to be in the second set of similar segments when a difference value obtained on comparison between a second signature of the segment and a second level signature of the similar segment is less than a threshold;
when the second set of similar segments includes at least one similar segment, ascertain a matching segment from the second set of similar segments; and
provide the matching segment for being stored in place of the segment in a storage medium,
wherein the first level signature of each of the stored segments, the second level signature, and the stored segments are stored in the storage medium previously to and separate from the video stream being obtained.

18. The non-transitory computer-readable medium of claim 17, further comprising computer-readable instructions that when executed by a processor cause the processor to:
- de-duplicate the storage medium to obtain de-duplicated data corresponding to the video stream; and
- transfer the de-duplicated data to another storage medium over a network.

19. The non-transitory computer-readable medium of claim 17, further comprising computer-readable instructions that when executed by a processor cause the processor to:
- select the matching segment from the second set of similar segments based on a rule when the second set of similar segments comprises a plurality of similar segments, wherein the rule is one of:
  - selecting the similar segment for which a difference value between the second level signature of the similar segment and the second signature is the least, in comparison to corresponding difference values for other similar segments in the plurality of similar segments, as the matching segment; and
  - selecting a chronologically most recent similar segment from the plurality of similar segments as the matching segment.

20. The non-transitory computer-readable medium of claim 17, further comprising computer-readable instructions that when executed by a processor cause the processor to:
- store the segment in the storage medium when no stored segment is selected to be in the first set of similar segments or no similar segment is selected to be in the second set of stored segment; and
- store the first signature and the second signature in an index comprising first level signatures and second level signatures, wherein the index is one of a dictionary and a de-duplication index of the storage medium.

* * * * *